United States Patent
Aitcin

(10) Patent No.: US 11,306,809 B2
(45) Date of Patent: Apr. 19, 2022

(54) DRIVE PULLEY FOR A CONTINUOUSLY VARIABLE TRANSMISSION

(71) Applicant: BOMBARDIER RECREATIONAL PRODUCTS INC., Valcourt (CA)

(72) Inventor: Xavier-Pierre Aitcin, St-Hyacinthe (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 508 days.

(21) Appl. No.: 16/274,939

(22) Filed: Feb. 13, 2019

(65) Prior Publication Data
US 2020/0166115 A1    May 28, 2020

Related U.S. Application Data

(60) Provisional application No. 62/772,289, filed on Nov. 28, 2018.

(51) Int. Cl.
| | |
|---|---|
| *F16H 55/56* | (2006.01) |
| *B62M 11/12* | (2006.01) |
| *B62M 27/02* | (2006.01) |
| *F16H 9/18* | (2006.01) |

(52) U.S. Cl.
CPC ........... *F16H 55/563* (2013.01); *B62M 11/12* (2013.01); *B62M 27/02* (2013.01); *F16H 9/18* (2013.01)

(58) Field of Classification Search
CPC ...... F16H 55/563; F16H 55/56; F16H 63/067; F16H 61/66272; F16H 61/66245
USPC ..................................... 474/13, 14
See application file for complete search history.

(56) References Cited

U.S. PATENT DOCUMENTS

| | | | | |
|---|---|---|---|---|
| 3,224,287 A | * | 12/1965 | Gesche | F16H 61/6625 |
| | | | | 474/19 |
| 3,362,242 A | * | 1/1968 | Watkins | F16H 55/563 |
| | | | | 474/15 |
| 3,722,308 A | * | 3/1973 | Steuer | F16H 55/56 |
| | | | | 474/19 |

(Continued)

FOREIGN PATENT DOCUMENTS

| | | |
|---|---|---|
| CA | 2129791 A1 | 2/1996 |
| CA | 2261294 A1 | 2/1997 |

(Continued)

OTHER PUBLICATIONS

International Search Report of PCT/IB2015/052374; Lee W. Young; dated Jul. 28, 2015.

(Continued)

*Primary Examiner* — Henry Y Liu
(74) *Attorney, Agent, or Firm* — BCF LLP

(57) ABSTRACT

A drive pulley for a CVT has a fixed sheave, a movable sheave, a spider, a biasing member biasing the movable sheave axially away from the fixed sheave, at least one centrifugal actuator and at least one slider assembly. The at least one slider assembly has a slider block connected to one of the movable sheave and the spider and abutting another one of the movable sheave and the spider. The slider block slides along the other one of the movable sheave and the spider as the movable sheave moves axially. The at least one slider assembly transfers torque between the movable sheave and the spider. A slider block for a drive pulley of a CVT is also described.

20 Claims, 13 Drawing Sheets

(56) References Cited

U.S. PATENT DOCUMENTS

| | | | | |
|---|---|---|---|---|
| 3,777,583 A * | 12/1973 | Talbot | F16H 55/563 | 474/14 |
| 3,861,229 A * | 1/1975 | Domaas | F16H 61/66245 | 474/14 |
| 3,916,707 A * | 11/1975 | Wells | F16H 61/66245 | 474/14 |
| 3,939,720 A * | 2/1976 | Aaen | F16H 55/563 | 474/14 |
| 3,958,461 A * | 5/1976 | Aaen | F16H 55/563 | 474/14 |
| 4,027,544 A * | 6/1977 | Kobayashi | F16H 55/563 | 474/14 |
| 4,378,221 A * | 3/1983 | Huff | F16H 55/56 | 192/111.1 |
| 4,464,144 A * | 8/1984 | Kobayashi | F16H 55/563 | 474/11 |
| 4,575,363 A * | 3/1986 | Burgess | F16H 55/563 | 474/14 |
| 4,735,598 A * | 4/1988 | Moroto | F16H 63/067 | 474/29 |
| 4,826,467 A * | 5/1989 | Reese | F16H 55/563 | 474/14 |
| 5,326,330 A * | 7/1994 | Bostelmann | F16H 55/563 | 474/13 |
| 5,328,413 A * | 7/1994 | Robert | F16H 55/563 | 474/13 |
| 5,358,450 A * | 10/1994 | Robert | F16H 55/563 | 474/13 |
| 5,403,240 A * | 4/1995 | Smith | F16H 55/56 | 474/19 |
| 5,421,784 A * | 6/1995 | Robert | F16H 55/563 | 474/13 |
| 5,458,539 A * | 10/1995 | Landry | F16H 55/563 | 474/13 |
| 5,468,191 A * | 11/1995 | Monahan | F16H 55/563 | 474/47 |
| 5,478,284 A * | 12/1995 | Imaida | F16C 35/067 | 474/8 |
| 5,516,332 A | 5/1996 | Robert | | |
| 5,516,333 A * | 5/1996 | Benson | F16H 55/56 | 192/54.52 |
| 5,529,544 A * | 6/1996 | Berto | F16H 55/563 | 474/11 |
| 5,562,555 A * | 10/1996 | Peterson | F16H 55/563 | 192/105 CD |
| 5,597,060 A * | 1/1997 | Huddleston | F16H 55/563 | 192/105 C |
| 5,647,810 A * | 7/1997 | Huddleston | F16C 13/006 | 192/105 CD |
| 5,692,983 A * | 12/1997 | Bostelmann | F16H 55/563 | 474/14 |
| 5,720,681 A * | 2/1998 | Benson | F16H 55/56 | 192/54.52 |
| 5,795,255 A * | 8/1998 | Hooper | F16H 61/66245 | 474/14 |
| 5,797,816 A * | 8/1998 | Bostelmann | F16H 55/563 | 474/14 |
| 5,941,787 A * | 8/1999 | Imaida | F16H 63/065 | 474/18 |
| 6,095,937 A * | 8/2000 | Aaen | F16H 61/66227 | 192/54.52 |
| 6,120,399 A * | 9/2000 | Okeson | F16H 55/56 | 474/12 |
| 6,149,540 A * | 11/2000 | Johnson | F16H 9/18 | 474/14 |
| 6,309,317 B1* | 10/2001 | Joss | F16D 43/06 | 474/13 |
| 6,334,826 B1* | 1/2002 | Takagi | F16H 55/563 | 474/12 |
| 6,346,056 B1* | 2/2002 | Nouis | F16H 61/66272 | 474/14 |
| 6,379,274 B1* | 4/2002 | Robert | F16H 55/56 | 474/12 |
| 6,413,178 B1* | 7/2002 | Chamberland | F16H 55/56 | 474/12 |
| 6,520,878 B1* | 2/2003 | Leclair | F16H 55/563 | 474/12 |
| 6,733,406 B2 | 5/2004 | Kitai et al. | | |
| 6,743,129 B1* | 6/2004 | Younggren | F16H 55/56 | 474/17 |
| 6,811,504 B2* | 11/2004 | Korenjak | F01B 1/12 | 474/13 |
| 6,949,039 B2* | 9/2005 | Labbe | F16H 55/56 | 474/19 |
| 6,953,400 B2 | 10/2005 | Kalies | | |
| 6,958,024 B2 | 10/2005 | Takano | | |
| 6,997,833 B2* | 2/2006 | Labbe | F16H 61/66272 | 474/12 |
| 7,927,241 B2* | 4/2011 | Labbe | F16H 55/56 | 474/19 |
| 8,272,981 B2* | 9/2012 | Galletti | F16H 55/56 | 474/19 |
| 8,409,039 B2 | 4/2013 | Beyer | | |
| 8,894,520 B2* | 11/2014 | Labbe | F16H 63/067 | 474/19 |
| 9,228,644 B2* | 1/2016 | Tsukamoto | F16H 55/563 | |
| 9,500,264 B2* | 11/2016 | Aitcin | F16H 9/18 | |
| 9,933,064 B2* | 4/2018 | Aitcin | F16H 9/18 | |
| 10,066,729 B2* | 9/2018 | Aitcin | B62M 27/02 | |
| 10,767,745 B2* | 9/2020 | Zauner | F16H 55/56 | |
| 2002/0065156 A1 | 5/2002 | Younggren | F16H 55/56 | 474/19 |
| 2002/0119846 A1* | 8/2002 | Kitai | F16H 55/56 | 474/14 |
| 2002/0123400 A1* | 9/2002 | Younggren | F16H 63/067 | 474/14 |
| 2003/0054909 A1* | 3/2003 | Flaspeter | F16H 55/56 | 474/19 |
| 2003/0092529 A1* | 5/2003 | Gu | B60K 6/543 | 477/44 |
| 2004/0063524 A1* | 4/2004 | Zulawski | F16H 55/56 | 474/19 |
| 2004/0082415 A1* | 4/2004 | Borghi | F16H 55/563 | 474/13 |
| 2004/0142781 A1* | 7/2004 | Huddleston | F16H 61/66272 | 474/19 |
| 2004/0185974 A1* | 9/2004 | Labbe | F16H 63/067 | 474/19 |
| 2004/0185980 A1* | 9/2004 | Labbe | F16H 61/66272 | 474/244 |
| 2004/0214668 A1* | 10/2004 | Takano | F16H 55/563 | 474/14 |
| 2004/0229724 A1* | 11/2004 | Kalies | F16H 55/56 | 474/19 |
| 2005/0043128 A1 | 2/2005 | Zulawski | | |
| 2005/0079937 A1* | 4/2005 | Heide | F16H 55/56 | 474/14 |
| 2005/0209032 A1* | 9/2005 | Aitcin | F16H 61/66272 | 474/19 |
| 2006/0276282 A1* | 12/2006 | Jonckheere | F16H 63/067 | 474/29 |
| 2008/0047772 A1* | 2/2008 | Ishida | F16H 55/563 | 180/366 |
| 2008/0312013 A1* | 12/2008 | Unno | F16H 63/067 | 474/18 |
| 2009/0042678 A1* | 2/2009 | Labbe | F16H 63/067 | 474/19 |
| 2009/0048046 A1* | 2/2009 | Jocelyn | F16H 55/56 | 474/13 |
| 2009/0156338 A1* | 6/2009 | Galletti | F16H 9/12 | 474/19 |
| 2009/0227404 A1* | 9/2009 | Beyer | F16H 63/067 | 474/14 |
| 2010/0144487 A1* | 6/2010 | Noboru | B60K 6/48 | 477/39 |
| 2010/0167852 A1* | 7/2010 | Labbe | F16H 63/067 | 474/8 |

(56) References Cited

U.S. PATENT DOCUMENTS

| | | | |
|---|---|---|---|
| 2011/0092325 A1* | 4/2011 | Vuksa | F16H 63/067 474/14 |
| 2012/0214626 A1* | 8/2012 | Cook | F16H 55/563 474/14 |
| 2014/0004984 A1* | 1/2014 | Aitcin | F16H 63/067 474/14 |
| 2014/0031155 A1* | 1/2014 | Tsukamoto | F16H 63/067 474/46 |
| 2014/0235382 A1* | 8/2014 | Tsukamoto | F16H 63/067 474/14 |
| 2014/0315670 A1* | 10/2014 | Mariotti | F16H 9/12 474/12 |
| 2014/0349792 A1* | 11/2014 | Aitcin | F16H 63/067 474/13 |
| 2015/0011344 A1* | 1/2015 | Ebihara | F16H 63/062 474/8 |
| 2015/0024882 A1* | 1/2015 | Ochab | F16H 63/067 474/19 |
| 2017/0030454 A1* | 2/2017 | Aitcin | F16H 55/563 |

FOREIGN PATENT DOCUMENTS

| | | |
|---|---|---|
| CA | 2240636 A1 | 1/1999 |
| CA | 2270002 A1 | 10/2000 |
| CA | 2346318 A1 | 11/2002 |
| CA | 2411316 A1 | 5/2004 |
| CA | 2389965 C | 1/2005 |
| CA | 2493455 A1 | 7/2005 |
| CA | 2346321 C | 8/2007 |
| CA | 2346319 C | 9/2007 |
| CA | 2385040 C | 6/2008 |
| CA | 2774253 A1 | 3/2011 |
| WO | 2013032463 A2 | 3/2013 |
| WO | 2013032463 A3 | 2/2014 |

OTHER PUBLICATIONS

Polaris Industries Inc., RZR OEM Parts, retrieved from https://rzr.polaris.com/en-ca/parts/ on Nov. 22, 2018.
Polaris RZR Forums.netXPT Clutch problem, retrieved from https://www.rzrforums.net/rzr-xp-turbo/190761-xpt-clutch-problem-6.html on Nov. 22, 2018.

* cited by examiner

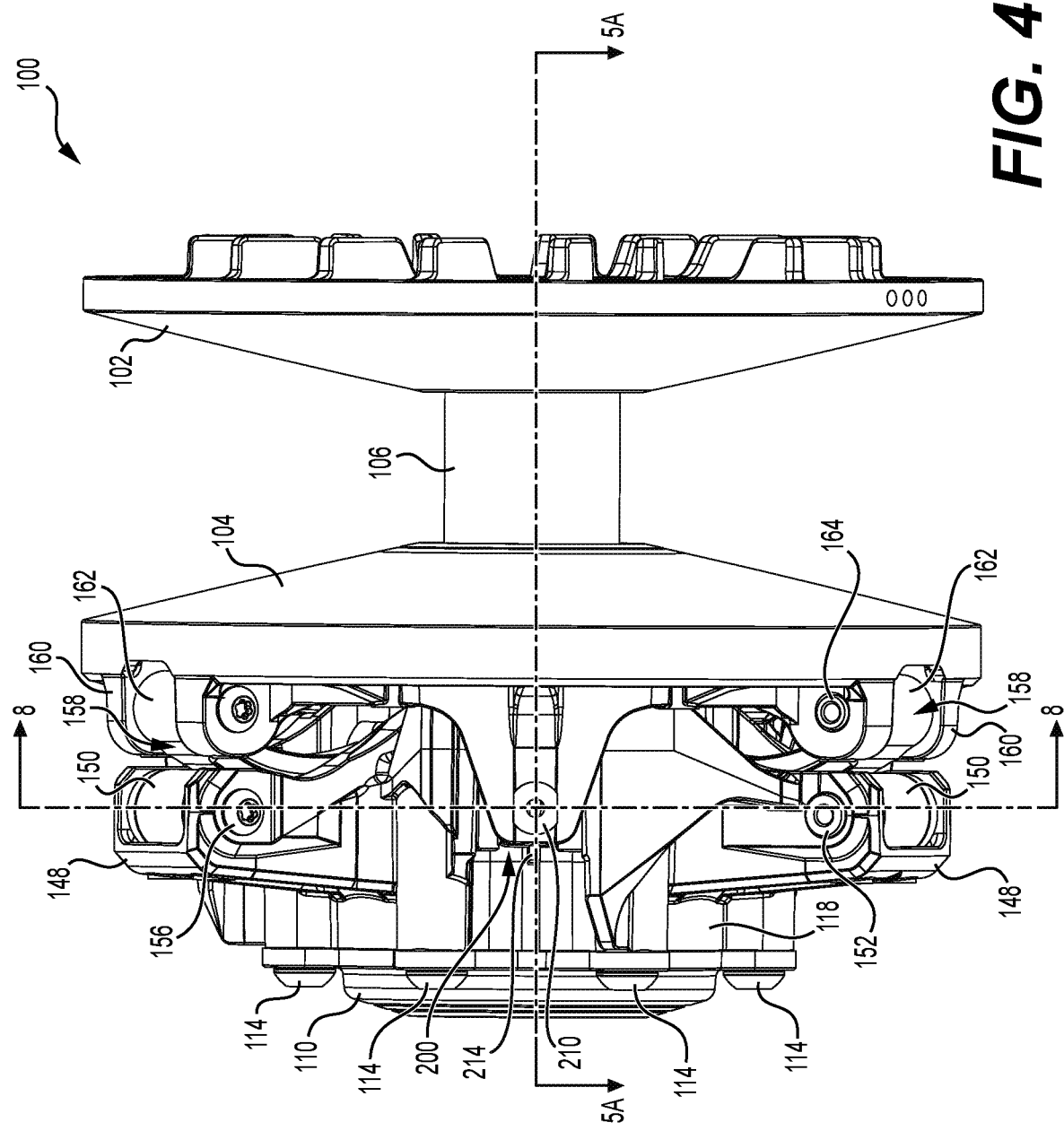

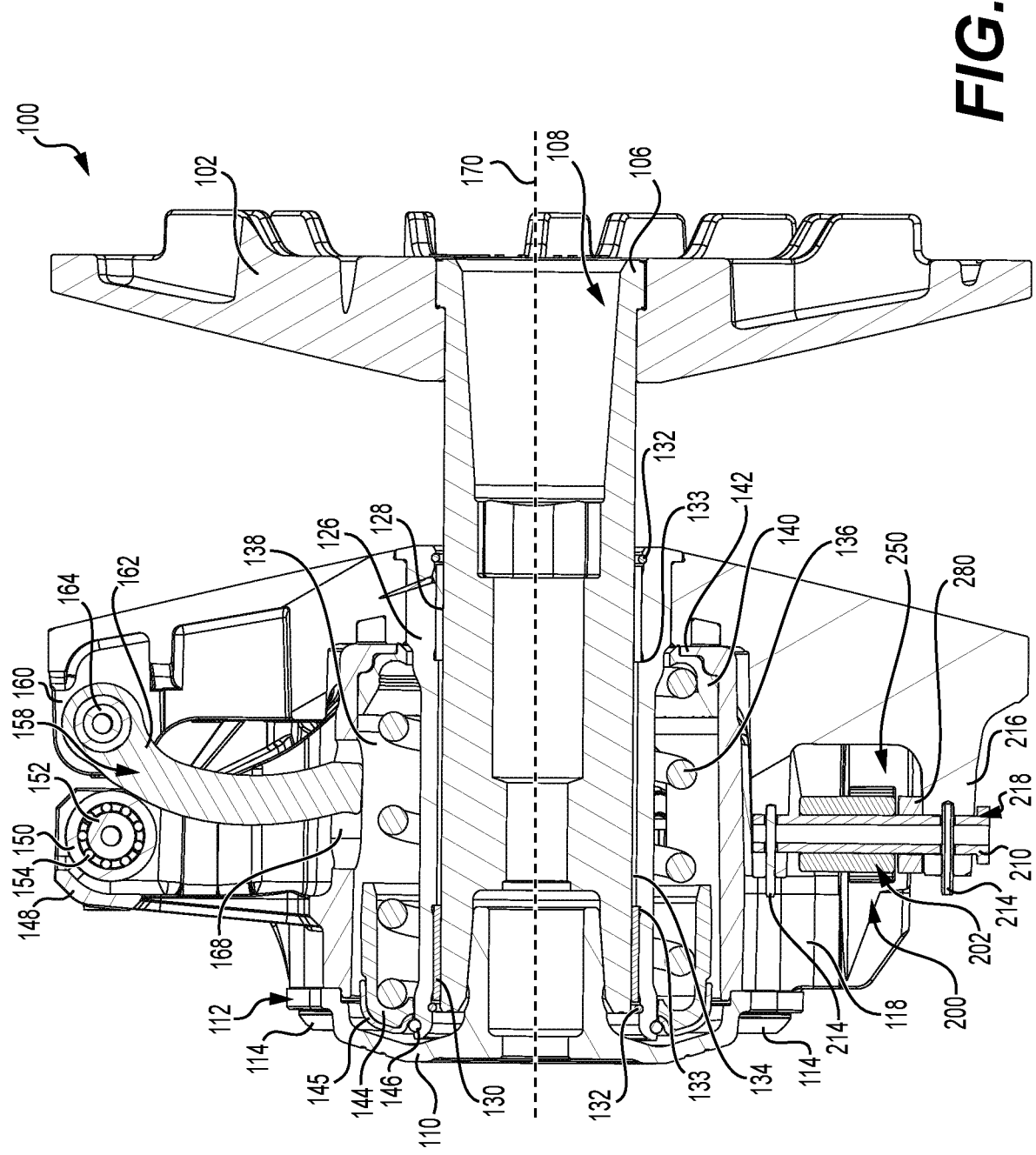

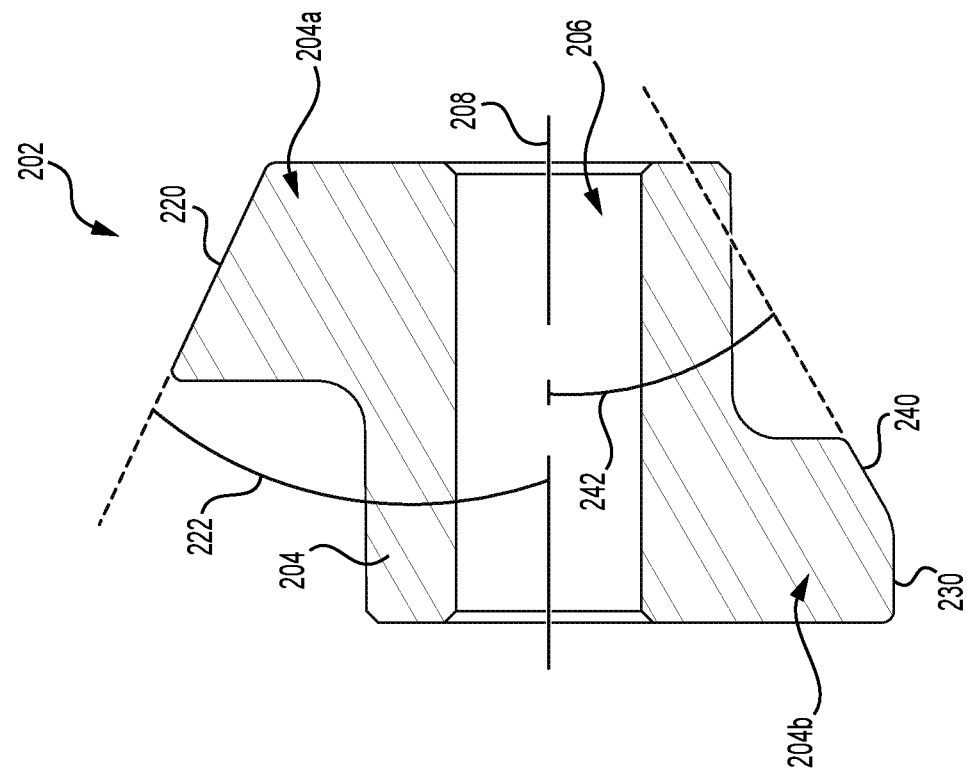
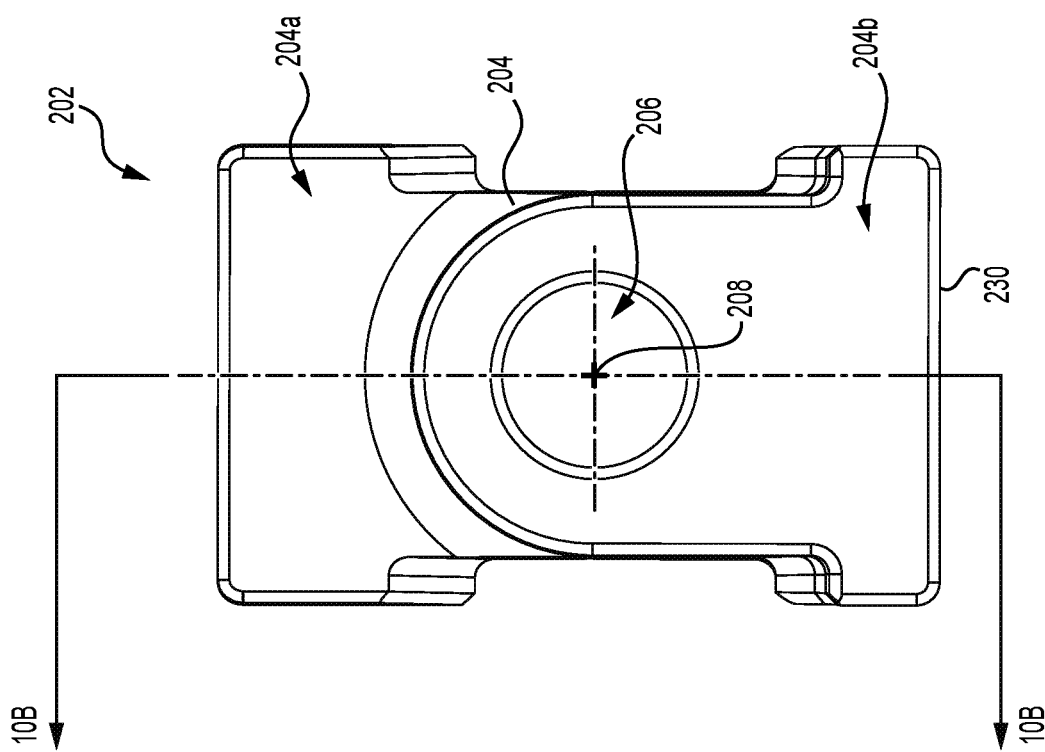
FIG. 10B
FIG. 10A

DRIVE PULLEY FOR A CONTINUOUSLY VARIABLE TRANSMISSION

CROSS-REFERENCE TO RELATED APPLICATION

The present application claims priority to U.S. Provisional Patent Application Ser. No. 62/772,289, filed Nov. 28, 2018, titled "Drive Pulley For A Continuously Variable Transmission", which is incorporated herein by reference in its entirety.

TECHNICAL FIELD

The present technology relates to drive pulleys for continuously variable transmissions.

BACKGROUND

Conventional snowmobile powertrains incorporate a continuously variable transmission (CVT) having a drive pulley that is operatively coupled to the engine crankshaft and a driven pulley coupled to a driven shaft. The drive pulley transfers torque to the driven pulley via a drive belt looped around both pulleys. Typically, the driven shaft is a transverse jackshaft which drives the input member of a chain and sprocket reduction drive. The output of the reduction drive is coupled to one end of an axle on which are located the drive track drive sprocket wheels.

The drive pulley includes centrifugal actuators through which the drive ratio of the drive pulley is varied progressively as a function of the engine speed. The centrifugal actuators are connected to a movable sheave of the drive pulley. The drive pulley also includes a fixed sheave which is axially fixed. The fixed sheave and the movable sheave are rotatable together. The movable sheave is movable axially toward the fixed sheave by the action of the centrifugal actuators and away from the fixed sheave by a biasing spring. The centrifugal actuators generally consist of centrifugal weights in the form of adjusting arms. Each of the arms is connected to the movable sheave of the drive pulley by a pin, and pivots outwards about its corresponding pin. As they pivot, the arms are in contact with corresponding rollers disposed on a spider fixed relative to the fixed sheave. When the adjusting arms pivot outwards as a result of centrifugal force, they slide against their corresponding roller and the axially movable sheave is pushed towards the fixed sheave.

Due to manufacturing tolerances and the type of connection used, it is possible that the spider and movable sheave can rotate slightly relative to one another during acceleration and deceleration of the drive pulley. As a result, the adjusting arms move slightly in a direction generally parallel to an axis of rotation or their corresponding rollers. This is sometimes referred to as backlash. This slight movement causes rubbing of the adjustable arms against their respective rollers and can result in portions of the arms, the rollers or both to wear and form a flat portion or a recess. In the case of worn surfaces of the arms, the way in which the movable sheave is moved by the arms in response to the speed of rotation of the drive pulley is negatively affected. In the case of worn surfaces of the rollers, it is possible that once the worn surface of a roller makes contact with its corresponding arm, the roller stops rolling, thereby further rubbing against the arm and exacerbating the problem. In both cases, the relative movement between the fixed and movable sheaves is impeded and the transfer of power from the engine to the track is reduced.

Therefore, there is a need for a drive pulley that reduces or eliminates relative rotation between the spider and the movable sheave to help prevent wear of the centrifugal actuators.

SUMMARY

It is an object of the present to ameliorate at least some of the inconveniences present in the prior art.

According to an aspect of the present technology, there is provided a drive pulley for a continuously variable transmission including a fixed sheave having an axis of rotation, a movable sheave axially movable relative to the fixed sheave, a spider axially fixed relative to the fixed sheave and rotationally fixed relative to the movable sheave, the movable sheave being disposed axially between the spider and the fixed sheave, a biasing member biasing the movable sheave axially away from the fixed sheave, at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the fixed sheave, and at least one slider assembly including a slider block connected to one of the movable sheave and the spider and abutting another one of the movable sheave and the spider, the slider block sliding along the other one of the movable sheave and the spider as the movable sheave moves axially, the slider block moving along a radially extending sliding axis, the at least one slider assembly transferring torque between the movable sheave and the spider. For each of the at least one slider assembly, the other one of the movable sheave and the spider defines a passage between a first wall and a second wall, the slider block is disposed in the passage, the slider block has a first surface abutting and sliding along the first wall, the slider block has second and third surfaces abutting and sliding along the second wall, the first surface is larger than the second surface, the first surface is disposed radially outward of the second surface relative to the axis of rotation of the fixed sheave, the first and second surfaces are planar, the first surface extends circumferentially further away from the sliding axis than the second surface, the first surface is angled relative to the sliding axis, the second surface is parallel to the sliding axis, the third surface is angled relative to the sliding axis, the first and third surfaces extend toward the sliding axis as they extend away from the axis of rotation of the fixed sheave, a fourth surface of the first wall abutting the first surface of the slider block is angled relative to the sliding axis, a fifth surface of the second wall abutting the second surface of the slider block is parallel to the sliding axis, a sixth surface of the second wall abutting the third surface of the slider block is angled relative to the sliding axis, and the fourth and sixth surfaces extend toward the sliding axis as they extend away from the axis of rotation of the fixed sheave.

In some implementations, for each of the at least one slider assembly, the slider block is connected to the movable sheave.

In some implementations, each of the at least one slider assembly further includes a radially extending shaft connected to the movable sheave, the shaft defining a shaft axis, the sliding axis being the shaft axis, and for each of the at least one slider assembly, the slider block is mounted to the shaft.

In some implementations, the shaft is cylindrical, and the slider block has a body defining a cylindrical aperture dimensioned to receive the shaft therein.

In some implementations, for each of the at least one slider assembly, the shaft axis is perpendicular to and intersects the axis of rotation of the fixed sheave.

In some implementations, each of the at least one slider assembly further includes at least one pin connecting the shaft to the movable sheave.

In some implementations, for each of the at least one slider assembly, the slider block is movable along the shaft.

In some implementations, each of the at least one slider assembly further includes a bumper mounted to the shaft and being disposed radially outward of the slider block relative to the axis of rotation of the fixed sheave, the bumper being structured to abut the slider block and limit the movement of the slider block along the shaft.

In some implementations, for each of the at least one slider assembly, the third surface of the slider block abuts the sixth surface of the second wall before the slider block abuts the bumper.

In some implementations, a first angle is defined between the first surface and the sliding axis, a second angle is defined between the third surface and the sliding axis, and the first and second angles are greater than 10 degrees.

In some implementations, the first angle is included between 20 and 30 degrees.

In some implementations, the second angle is included between 25 and 35 degrees.

In some implementations, the second angle is greater than the first angle.

In some implementations, the at least one centrifugal actuator is three centrifugal actuators disposed at 120 degrees from each other, the at least one slider assembly is three slider assemblies disposed at 120 degrees from each other, and the centrifugal actuators and the slider assemblies are arranged in an alternating arrangement and are disposed at 60 degrees from each other.

In some implementations, the arm of the at least one centrifugal actuator abuts a roller rotationally connected to another one of the movable sheave and the spider.

In some implementations, the drive pulley further includes a fixed sheave shaft connected to the fixed sheave and a movable sheave shaft connected to the movable sheave, the fixed sheave shaft being disposed at least in part inside the movable sheave shaft. The movable sheave shaft is disposed at least in part inside the biasing member, and the biasing member is disposed at least in part inside the spider.

In some implementations, for each of the at least one slider assembly, as the slider block wears, the slider block continues to abut and slide along the other one of the movable sheave and the spider as the movable sheave moves axially.

According to another aspect of the present technology, there is provided a continuously variable transmission including the drive pulley as described above, a driven pulley having a fixed sheave and a movable sheave axially movable relative to the fixed sheave, and a drive belt looped around the fixed and movable sheaves.

According to another aspect of the present technology, there is provided a vehicle having a frame, a motor connected to the frame, the continuously variable transmission described above, the drive pulley being operatively connected to and driven by the motor, a driven shaft connected to and driven by the driven pulley, and at least one ground engaging member operatively connected to the driven shaft.

In some implementations, the frame includes a tunnel, and the at least one ground engaging member is a drive track disposed at least in part under the tunnel. The vehicle further includes at least one ski operatively connected to the frame, and a straddle seat disposed above the tunnel.

According to yet another aspect of the present technology, there is provided a slider block for a drive pulley of a continuously variable transmission having first and second walls. The slider block has a slider block body defining an aperture extending therethrough, the aperture defining an aperture axis. The slider block body has a first surface and a second surface for abutting and sliding along the first and second walls of the drive pulley. The first and second surfaces extend on opposite sides of the aperture axis. The first surface is larger than the second surface. The first and second surfaces are angled relative to the aperture axis, and the first surface is axially offset relative to the second surface.

In some implementations, the first surface extends further away from the aperture axis than the second surface.

In some implementations, the first and second surfaces are planar.

In some implementations, a first angle is defined between the first surface and the aperture axis, a second angle is defined between the second surface and the aperture axis, and the first and second angles are greater than 10 degrees.

In some implementations, the first angle is included between 20 and 30 degrees.

In some implementations, the second angle is included between 25 and 35 degrees.

In some implementations, the slider block further includes a third surface for abutting and sliding along the second wall of the drive pulley, the third surface extending parallel to the aperture axis.

In some implementations, the third surface extends from the second surface.

In some implementations, the third surface is planar.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 4 is a bottom plan view of the drive pulley of FIG. 3, with the drive pulley in an opened position;

FIG. 5A is a cross-sectional view of the drive pulley of FIG. 3 taken through line 5A-5A of FIG. 4;

FIG. 10A is a view of a radially inward end of a slider block according to one implementation of the present technology;

FIG. 10B is a cross-sectional view of the slider block of FIG. 10A taken through line 10B-10B of FIG. 10A.

DETAILED DESCRIPTION

A drive pulley for a continuously variable transmission (CVT) will be described with respect to a snowmobile 10. However, it is contemplated that the pulley could be used in a CVT for other vehicles, such as, but not limited to, on-road vehicles, off-road vehicles, a motorcycle, a scooter, a three-wheel road vehicle and an all-terrain vehicle (ATV). It is also contemplated that the CVT could be used in devices other than vehicles.

Figure 1:
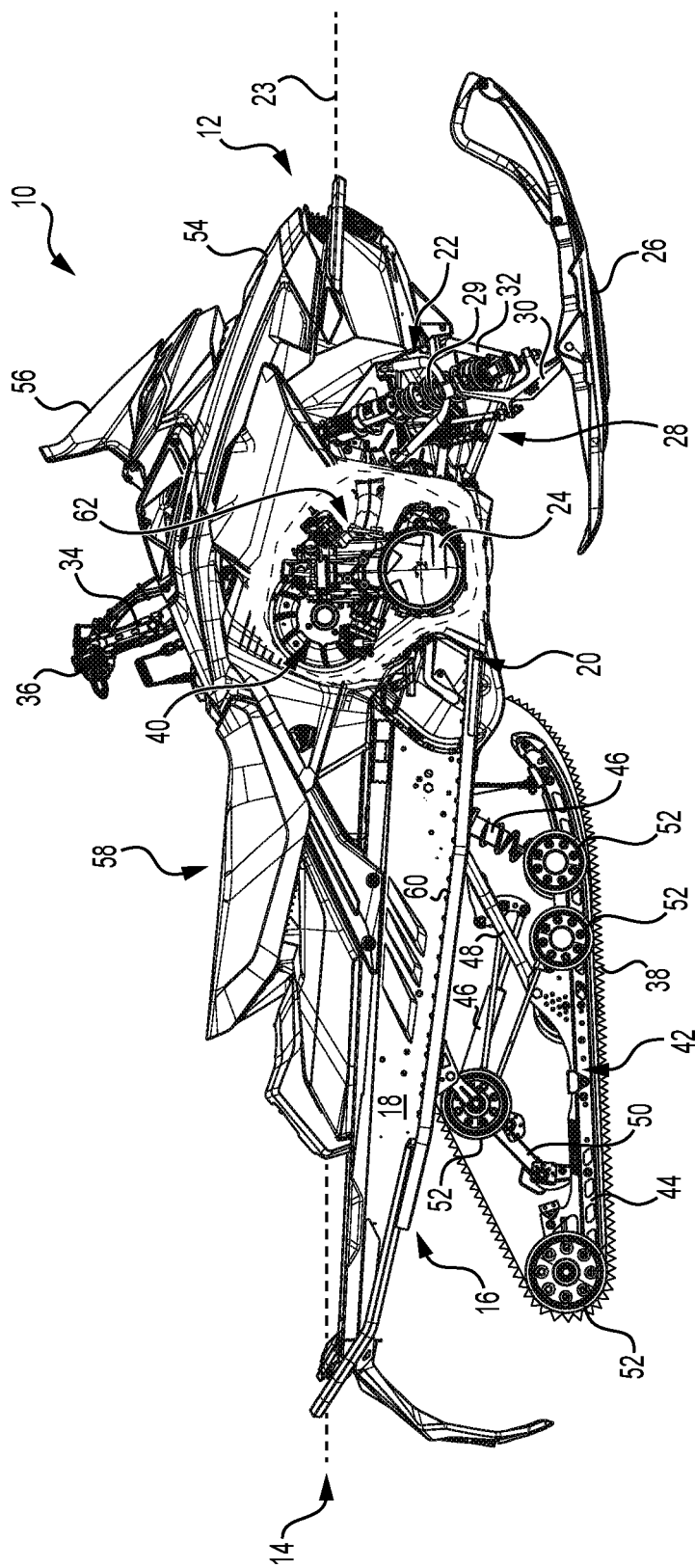
FIG. 1 is a right side elevation view of a snowmobile, with part of a powertrain of the snowmobile shown in a fragmented portion thereof.

Turning now to FIG. 1, a snowmobile 10 includes a forward end 12 and a rearward end 14 that are defined consistently with a forward travel direction of the snowmobile 10. The snowmobile 10 includes a frame 16 that includes a tunnel 18, a motor cradle portion 20 and a front suspension assembly portion 22. The tunnel 18 consists of one or more pieces of sheet metal arranged to form an inverted U-shape that is connected at the front to the motor cradle portion 20 and extends rearward therefrom along the longitudinal axis 23. A motor, which in the present implementation is an internal combustion engine 24, is carried by the motor cradle portion 20 of the frame 16. The internal construction of the engine 24 may be of any known type such as a two-stroke engine, a four-stroke engine or a diesel engine. It is contemplated that the engine 24 could be replaced by other types of motors, such as, but not limited to, an electric motor or an electric/internal combustion hybrid engine. Two skis 26 are positioned at the forward end 12 of the snowmobile 10 and are attached to the front suspension assembly portion 22 of the frame 16 through front suspension assemblies 28. Each front suspension assembly 28 includes a shock absorber assembly 29, a ski leg 30 and supporting arms 32. Ball joints and steering rods (not shown) operatively connect the skis 26 to a steering column 34. A steering input device in the form of handlebar 36 is attached to the upper end of the steering column 34 to allow a driver to rotate the ski legs 30 and thus the skis 26, in order to steer the snowmobile 10.

An endless drive track 38 is disposed generally under the tunnel 18 and is operatively connected to the engine 24 through a CVT 40 (shown in FIG. 1) which will be described in greater detail below. The endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes a plurality of shock absorbers 46 which may further include coil springs (not shown) surrounding the shock absorbers 46. Suspension arms 48 and 50 are provided to attach the slide rails 44 to the frame 16. A plurality of idler wheels 52 are also provided in the rear suspension assembly 42. Other types and geometries of rear suspension assemblies are also contemplated.

At the forward end 12 of the snowmobile 10, fairings 54 enclose the engine 24 and the CVT 40, thereby providing an external shell that protects the engine 24 and the CVT 40. The fairings 54 include a hood and one or more side panels that can be opened to allow access to the engine 24 and the CVT 40 when this is required, for example, for inspection or maintenance of the engine 24 and/or the CVT 40. A windshield 56 is connected to the fairings 54 near the forward end 12 of the snowmobile 10. Alternatively the windshield 56 could be connected directly to the handlebar 36. The windshield 56 acts as a wind screen to lessen the force of the air on the driver while the snowmobile 10 is moving forward.

A straddle-type seat 58 is positioned over the tunnel 18. Two footrests 60 are positioned on opposite sides of the snowmobile 10 below the seat 58 to accommodate the driver's feet.

Figure 2:
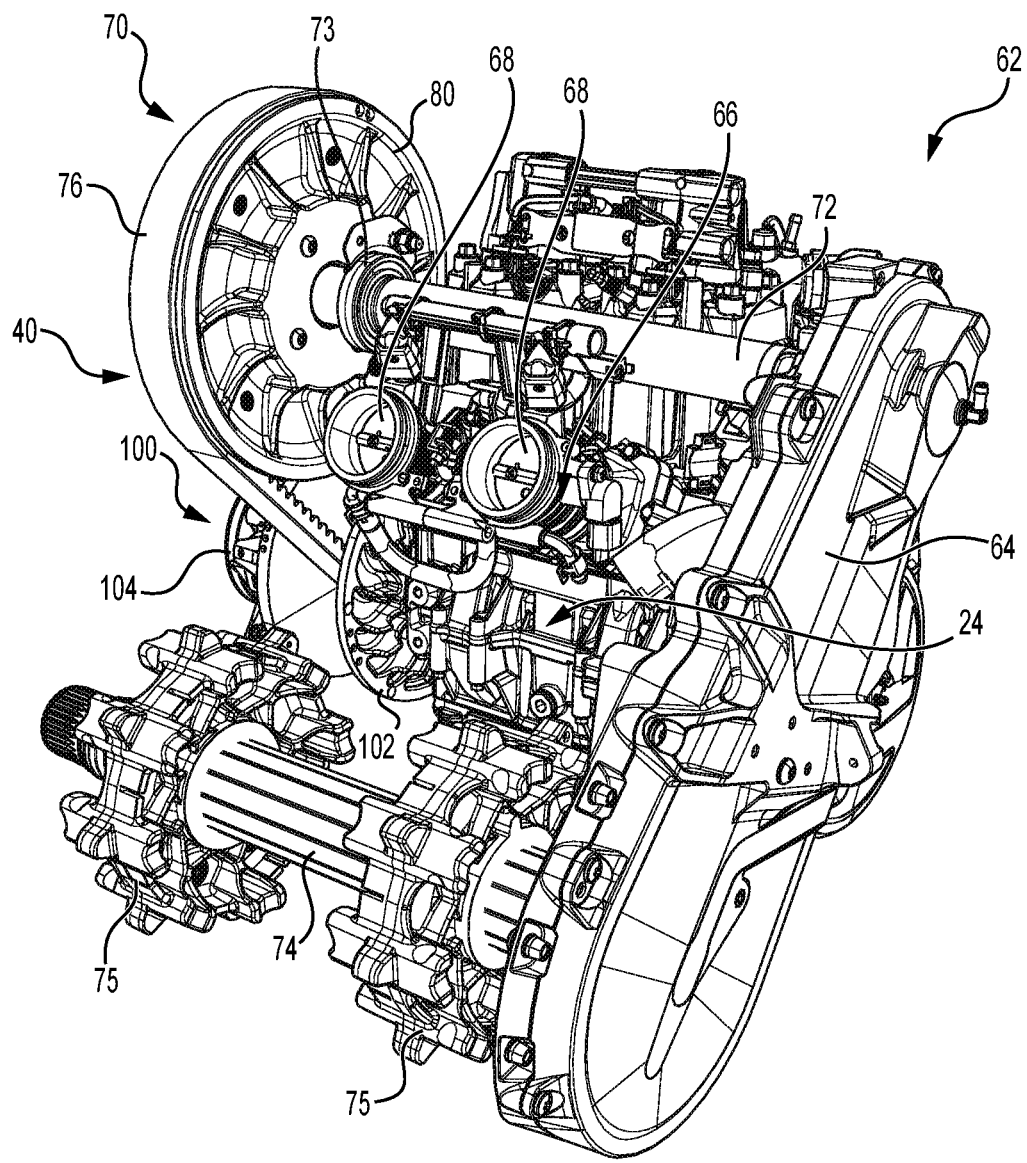
FIG. 2 is a perspective view, taken from a rear, right side, of the powertrain of the snowmobile of FIG. 1.

FIG. 2 illustrates a powertrain 62 of the snowmobile 10. The powertrain 62 includes the engine 24, the CVT 40 and a fixed ratio reduction drive 64. A throttle body 66 having throttle valves 68 therein is connected to air intake ports of the engine 24 to control the flow of air to the engine 24. It is contemplated that the throttle body 66 could be replaced by a carburetor. The engine 24 drives a crankshaft (not shown) that rotates about a horizontally disposed axis that extends generally transversely to the longitudinal axis 23 of the snowmobile 10. The crankshaft drives the CVT 40 for transmitting torque to the endless drive track 38 for propulsion of the snowmobile 10. The CVT 40 includes a drive pulley 100 coupled to the crankshaft to rotate with the crankshaft of the engine 24 and a driven pulley 70 coupled to one end of a transversely mounted jackshaft 72 that is supported on the frame 16 through bearings 73. The opposite end of the transversely mounted jackshaft 72 is connected to the input member of the reduction drive 64 and the output member of the reduction drive 64 is connected to a drive axle 74 carrying sprocket wheels 75 that form a driving connection with the endless drive track 38.

The drive pulley 100 of the CVT 40 includes a pair of opposed frustoconical belt drive sheaves 102 and 104 between which a drive belt 76 is located. The drive pulley 100 will be described in greater detail below. The driven pulley 70 includes a pair of frustoconical belt drive sheaves (only the inward sheave 80 is shown in FIG. 2) between which the drive belt 76 is located. As can be seen, the drive belt 76 is looped around both the drive pulley 100 and the driven pulley 70.

In the present implementation, the drive pulley 100 rotates at the same speed as the crankshaft of the engine 24 whereas the speed of rotation of the transversely mounted jackshaft 72 is determined in accordance with the instantaneous ratio of the CVT 40, and the drive axle 74 rotates at a lower speed than the transversely mounted jackshaft 72 because of the action of the reduction drive 64. The input member of the reduction drive 64 consists of a small sprocket connected to the transversely mounted jackshaft 72 and coupled to drive an output member consisting of a larger sprocket connected to the drive axle 74 through a driving chain, all enclosed within the housing of the reduction drive 64.

It is contemplated that the drive pulley 100 could be coupled to an engine shaft other than the crankshaft, such as an output shaft, a counterbalance shaft, or a power take-off shaft driven by the engine 24. The shaft driving the drive pulley 100 is therefore generally referred to herein as the driving shaft. Similarly, it is contemplated that the driven pulley 70 could be coupled to a shaft other than the transversely mounted jackshaft 72, such as directly to the drive axle 74 or any other shaft operatively connected to the propulsion element of the vehicle (i.e. the endless drive track 38 in the case of the snowmobile 10). The shaft driven by the driven pulley 70 is therefore generally referred to herein as the driven shaft.

Turning now to FIGS. 3 to 9, the drive pulley 100 will be described in more detail. As discussed above, the drive pulley 100 includes a pair of opposed frustoconical belt drive sheaves 102 and 104. Both sheaves 102 and 104 rotate together with the driving shaft. The sheave 102 is fixed in an axial direction relative to the driving shaft, and is therefore referred to as the fixed sheave 102. The fixed sheave 102 is also rotationally fixed relative to the driving shaft. The sheave 104 can move toward or away from the fixed sheave 102 in the axial direction of the driving shaft in order to change the drive ratio of the CVT 40, and is therefore referred to as the movable sheave 104. As can be seen in FIG. 2, the fixed sheave 102 is disposed between the movable sheave 104 and the engine 24.

The fixed sheave 102 is mounted on a fixed sheave shaft 106. The fixed sheave 102 is press-fitted on the fixed sheave shaft 106 such that the fixed sheave 102 rotates with the fixed sheave shaft 106. It is contemplated that the fixed sheave 102 could be connected to the fixed sheave shaft 106 in other known manners to make the fixed sheave 102 rotationally and axially fixed relative to the fixed sheave shaft 106. As can be seen in FIG. 5A, the fixed sheave shaft 106 is hollow and has a tapered hollow portion 108. The tapered hollow portion 108 receives the end of the driving shaft therein to transmit torque from the engine 24 to the drive pulley 100. A fastener (not shown) is inserted in the outer end (i.e. the left side with respect to FIG. 5A) of the drive pulley 100, inside the fixed sheave shaft 106, and screwed into the end of the driving shaft to prevent axial displacement of the fixed sheave shaft 106 relative to the driving shaft. It is contemplated that the fixed sheave shaft 106 could be connected to the driving shaft in other known manners to make the fixed sheave shaft 106 rotationally and axially fixed relative to the driving shaft. It is also contemplated that the driving shaft could be the fixed sheave shaft 106.

Figure 3:
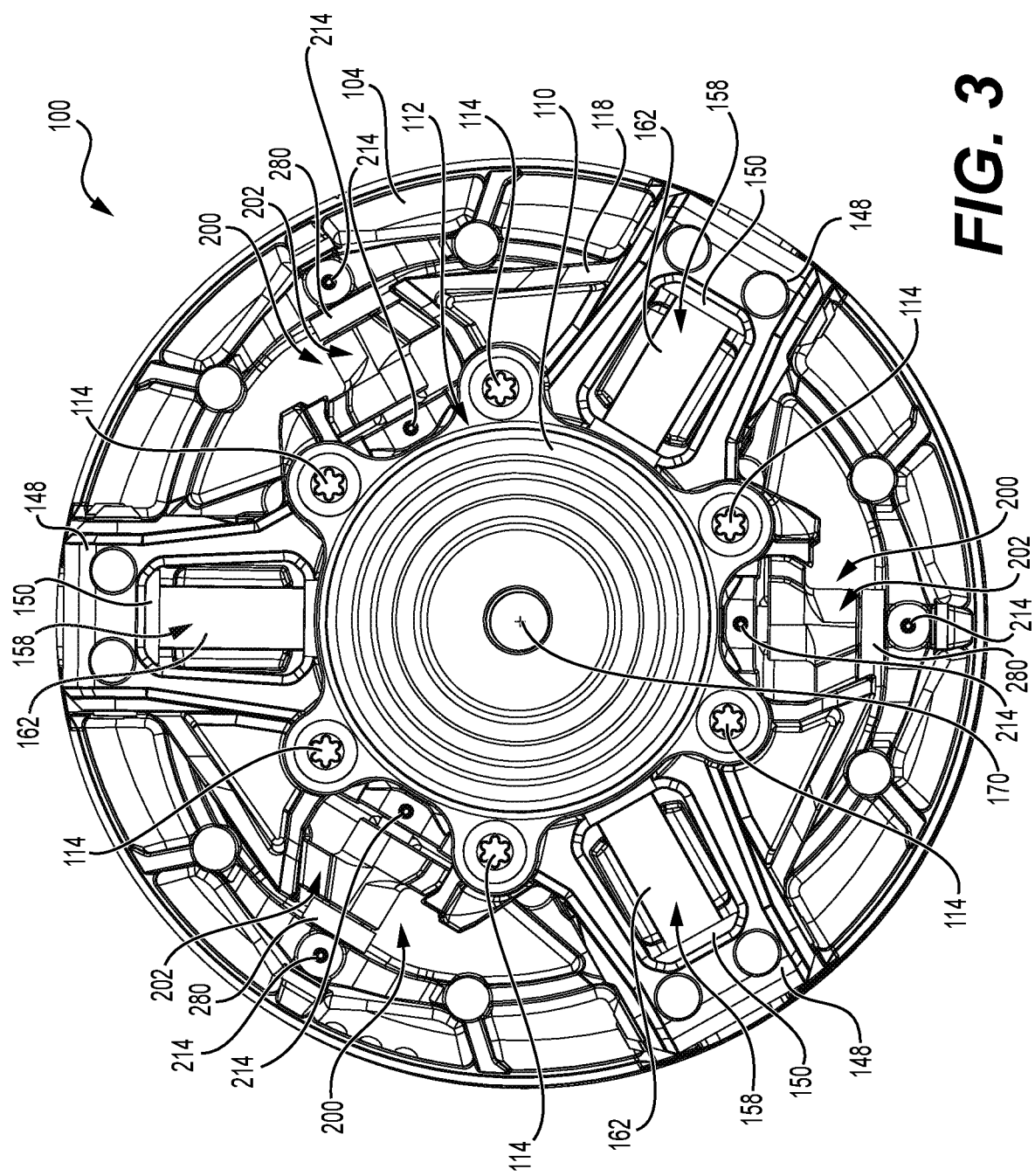
FIG. 3 is a left side elevation view of a drive pulley of a CVT of the powertrain of FIG. 2, with the drive pulley in an opened position.
Figure 5B:
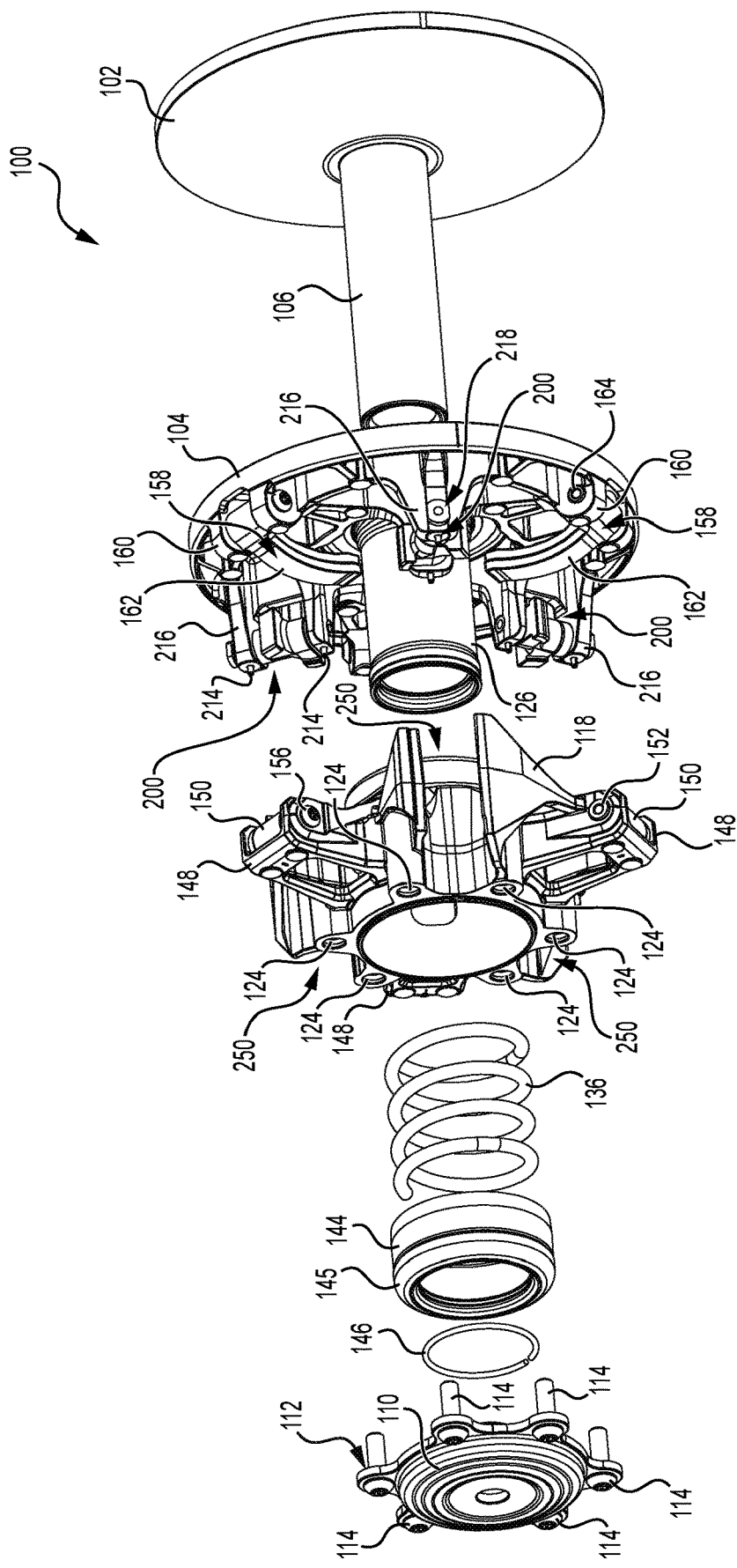
FIG. 5B is an exploded, perspective view taken from a bottom, left side of the drive pulley of FIG. 3.

Referring to FIGS. 3, 5A and 5B, a cap 110 is taper-fitted in the outer end of the fixed sheave shaft 106. The fastener used to connect the driving shaft to the fixed sheave shaft 106 is also inserted through the cap 110 to connect the cap 110 to the fixed sheave shaft 106. It is contemplated that the cap 110 could be connected to the fixed sheave shaft 106 by other means. The cap 110 has six outer peripheral projections 112. Six fasteners 114 are inserted through six apertures defined in the projections 112 and into a spider 118. Thus, the fasteners 114 connect the cap 110 directly to the spider 118. In other implementations, the cap 110 could be connected to an annular rubber damper, which is in turn connected to the spider 118. In such implementations, the annular rubber damper dampens the torque variations from the fixed sheave shaft 106 resulting from the combustion events in the engine 24.

The spider 118 is disposed around the fixed sheave shaft 106 and axially between the cap 110 and the movable sheave 104. The spider 118 is axially fixed relative to the fixed sheave 102. As can be seen in FIGS. 3 and 5B, the six fasteners 114 are inserted through the apertures defined in the projections 112 of the cap 110 and into apertures 124 of the spider 118 to fasten the cap 110 to the spider 118. As a result, torque is transferred between the fixed sheave shaft 106 and the spider 118 via the cap 110. The spider 118 therefore rotates with the fixed sheave shaft 106.

Referring to FIGS. 5A and 5B, a movable sheave shaft 126 is disposed around the fixed sheave shaft 106. The movable sheave 104 is press-fitted on the movable sheave shaft 126 such that the movable sheave 104 rotates and moves axially with the movable sheave shaft 126. It is contemplated that the movable sheave 104 could be connected to the movable sheave shaft 126 in other known manners to make the movable sheave 104 rotationally and axially fixed relative to the shaft 126. It is also contemplated that the movable sheave 104 and the movable sheave shaft 126 could be integrally formed. Two bushings 128, 130 are disposed radially between and abut the movable sheave shaft 126 and the fixed sheave shaft 106. The bushings 128, 130 are disposed adjacent opposite ends of the movable sheave shaft 126. Clips 132 disposed on one side of each of the bushings 128, 130 and grooves 133 defined in the movable sheave shaft 126 prevent the bushings 128, 130 from moving axially relative to the movable sheave shaft 126. As such, as the movable sheave 104, and therefore the movable sheave shaft 126, moves axially relative to the fixed sheave shaft 106, the bushings 128, 130 move axially together with the movable sheave shaft 126 and therefore move axially relative to the fixed sheave shaft 106. The bushings 128, 130 are made of a relatively low friction material thereby permitting easy axial movement of the movable sheave shaft 126 along the fixed sheave shaft 106. Examples of low friction material include, but are not limited to, brass and polyoxymethylene.

As can also be seen in FIG. 5A, an annular space 134 is defined between the bushings 128, 130, the movable sheave shaft 126 and the fixed sheave shaft 106. As can be seen, no component of the drive pulley 100 is disposed inside this annular space 134. As such, the annular space 134 extends continuously between the bushings 128, 130. Therefore, the construction of the illustrated implementation allows the length of the bushings 128, 130 in the axial direction to be selected in order to achieve a desired balance between the amount of friction generated by the bushings 128, 130 in the axial direction and their resistance to wear. For example, the bushings 128, 130 could be longer than illustrated. It is also contemplated that a single bushing or more than two bushings could be provided radially between the shafts 106, 126.

Figure 8:
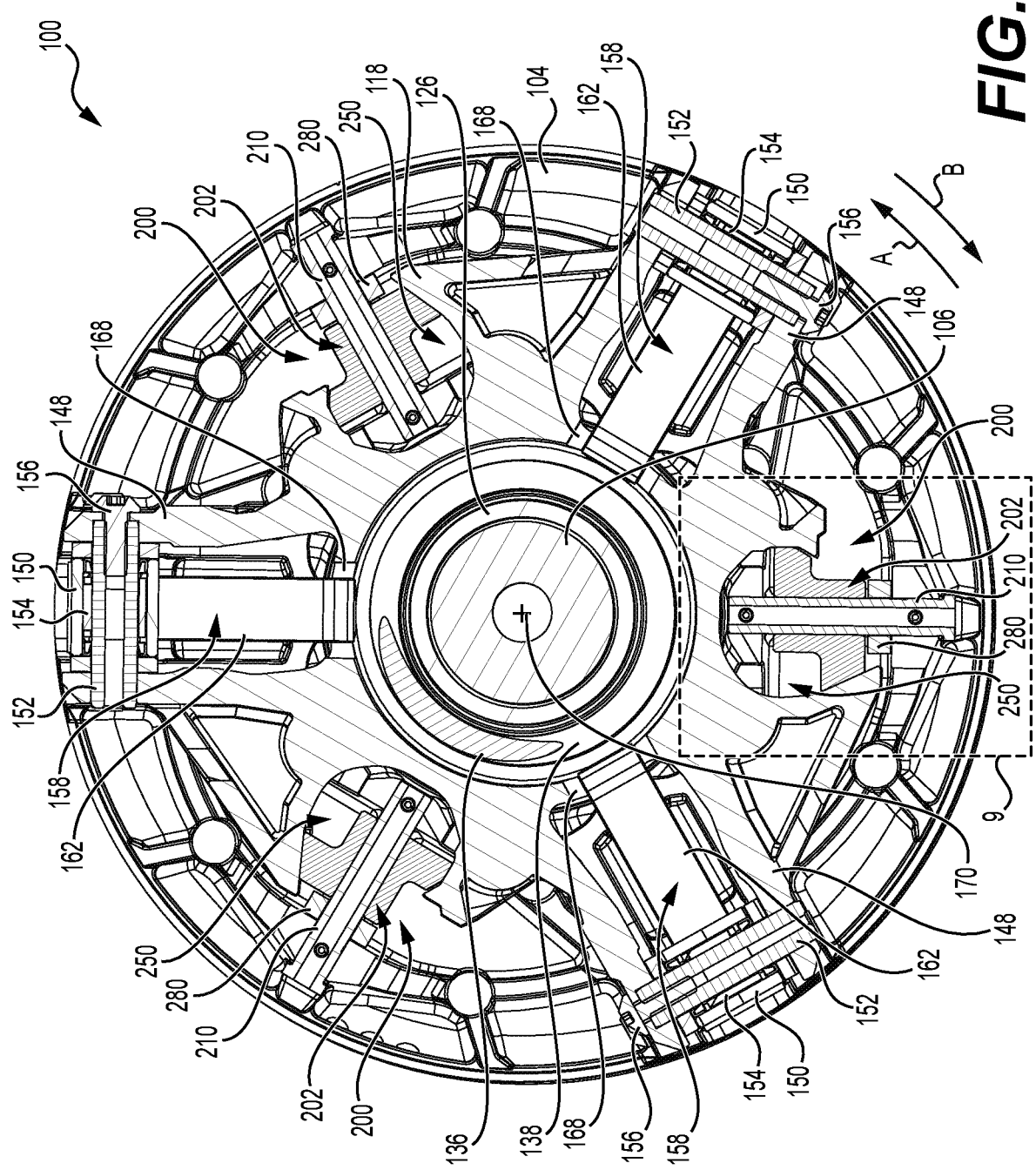
FIG. 8 is a cross-sectional view of the drive pulley of FIG. 3 taken through line 8-8 of FIG. 4, with the drive pulley in an opened position.

To transmit torque from the spider 118 to the movable sheave 104, a torque transfer assembly consisting of three slider assemblies 200 connected to the movable sheave 104 is provided. The slider assemblies 200 are disposed radially outward of the fixed and movable sheave shafts 106, 126. The slider assemblies 200 engage the spider 118 so as to permit low friction axial displacement of the movable sheave 104 relative to the spider 118 and to eliminate, or at least minimize, rotation of the movable sheave 104 relative to the spider 118. As described above, torque is transferred from the fixed sheave 102 to the spider 118 via the cap 110 and the fasteners 114. The spider 118 engages the slider assemblies 200 which transfer the torque to the movable sheave 104 with no, or very little, backlash. As such, the spider 118 is considered to be rotationally fixed relative to the movable sheave 104. The three slider assemblies 200 are disposed at 120 degrees from each other as best seen in FIGS. 3 and 8. It is contemplated that the slider assemblies 200 could be connected to the spider 118 and engage the movable sheave 104. It is contemplated that in some implementations, the torque transfer assembly could have more or less than three slider assemblies 200. The slider assemblies 200 will be described in greater detail below.

Figure 7:
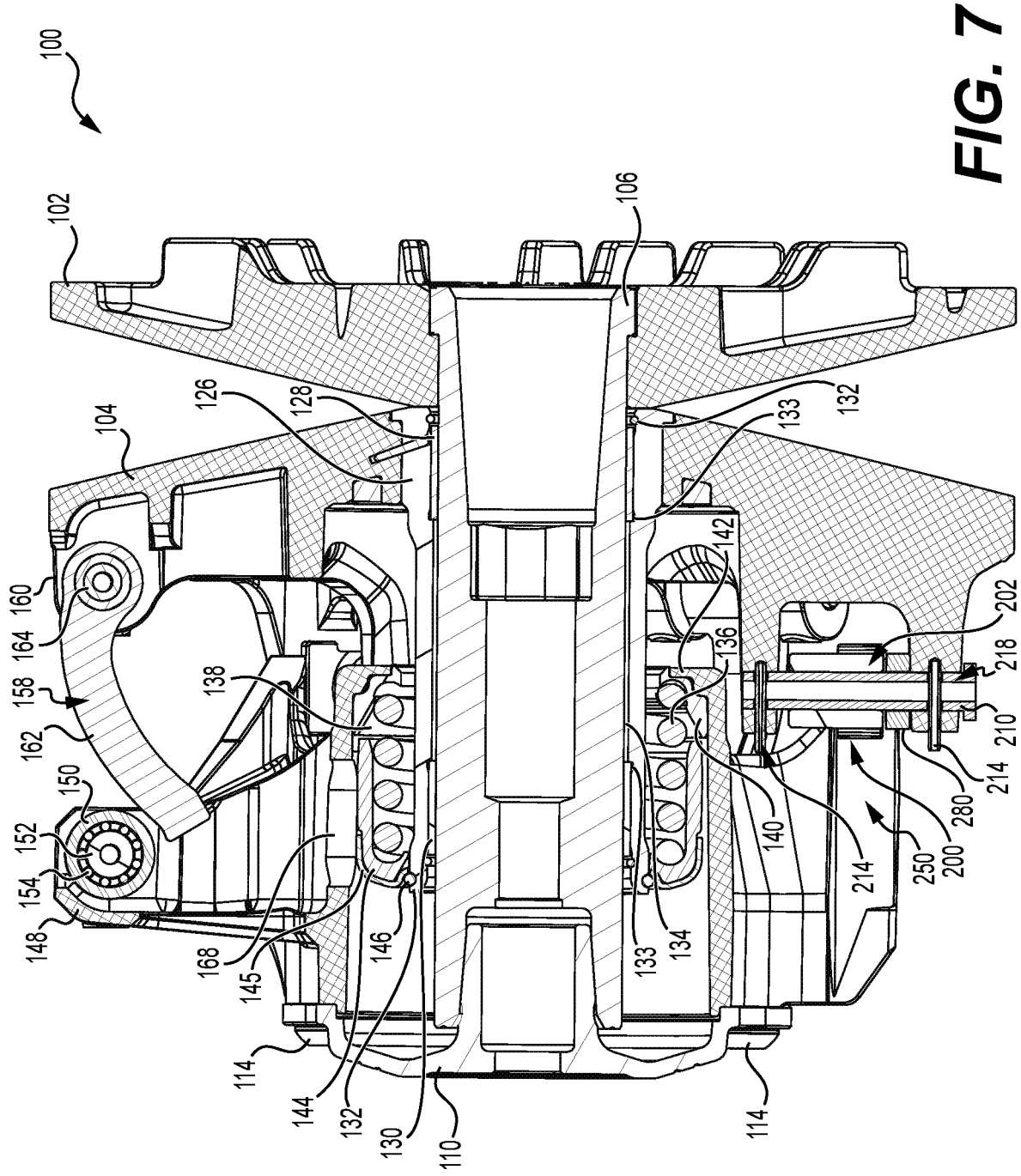
FIG. 7 is a cross-sectional view of the drive pulley of FIG. 3 taken through line 7-7 of FIG. 6, with the drive pulley in a closed position.

As can be seen in FIGS. 5A and 5B, a biasing member in the form of a coil spring 136 is disposed inside a cavity 138 defined radially between the movable sheave shaft 126 and the spider 118. At one end, the spring 136 abuts a fixed spring seat 140. The spring 136 biases the fixed spring seat 140 against a lip 142 of the spider 118, and therefore the fixed spring seat 140 is axially fixed relative to the spider 118. At the opposite end, the spring 136 abuts a movable spring seat 144. The movable spring seat 144 is held in place near the end of the movable sheave shaft 126 by the spring 136, a retaining ring 145 and a C-clip 146 engaging the movable sheave shaft 126, thereby making the movable spring seat 144 axially fixed relative to the movable sheave shaft 126. As a result, this end of the spring 136 (i.e. the left end with respect to FIG. 5A) and the movable spring seat 144 move axially relative fixed sheave shaft 106 when the movable sheave 104 and the movable sheave shaft 126 move axially. As the movable sheave 104 and the movable sheave shaft 126 move axially toward the fixed sheave 102, the spring 136 gets compressed as can be seen in FIG. 7. The spring 136 biases the movable sheave 104 and the movable sheave shaft 126 away from the fixed sheave 102 toward their position shown in FIG. 5A. It is contemplated that, in some implementations, the movable sheave 104 could be biased away from the fixed sheave 102 by mechanisms other than the spring 136. As can be seen in FIGS. 5A and 7, the bushing 128 is disposed axially between the spring 136 and the fixed sheave 102 and the bushing 130 is disposed in part axially between the ends of the spring 136.

As best seen in FIGS. 3 and 4, the spider 118 has three arms 148 disposed at 120 degrees from each other. Three rollers 150 are rotatably connected to the three arms 148 of the spider 118. As best shown in FIG. 8, each roller 150 is disposed around an axle 152. Needle bearings 154 are disposed between the rollers 150 and the axles 152. The axles 152 are inserted into apertures in their respective arms 148. Threaded fasteners 156 fasten the axles 152 to their respective arms 148.

Three centrifugal actuators 158 are pivotally connected to three brackets 160 formed by the movable sheave 104. Each roller 150 is aligned with a corresponding one of the centrifugal actuators 158. Since the spider 118 and the movable sheave 104 are rotationally fixed relative to each other, the rollers 150 remain aligned with their corresponding centrifugal actuators 158 when the shafts 106, 126 rotate. Also, since the slider assemblies 200 prevent backlash between the spider 118 and the movable sheave 104, wear of the centrifugal actuators 158 that would have resulted from this backlash is prevented. As best seen in FIG. 8, the centrifugal actuators 158 are disposed at 120 degrees from each other. The centrifugal actuators 158 and the slider assemblies 200 are arranged in an alternating arrangement and are disposed at 60 degrees from each other. It is contemplated that the rollers 150 could be pivotally connected to the brackets 160 and that the centrifugal actuators 158 could be connected to the arms 148 of the spider 118. It is also contemplated that there could be more or less than three centrifugal actuators 158, in which case there would be a corresponding number of arms 148, rollers 150 and brackets 160. It is also contemplated that the rollers 150 could be omitted and replaced with surfaces against which the centrifugal actuators 158 can slide as they pivot.

In the present implementation, each centrifugal actuator 158 includes an arm 162 that pivots about an axle 164 connected to its respective bracket 160 by a threaded fastener 166. The position of the arms 162 relative to their axles 164 is not adjustable. It is contemplated that the position of the arms 162 relative to their axles 164 could be adjustable as described in International Application Publication No. WO2013/032463 A2, published Mar. 7, 2013, the entirety of which is incorporated herein by reference.

A general operation of the drive pulley 100 will now be described. When the driving shaft is not turning or is turning at low speeds, the drive pulley 100 is in the configuration shown in FIGS. 3 to 5A. As can be seen in FIG. 5A, under these conditions, the ends of the arms 162 are received in apertures 168 defined in the spider 118. As the speed of rotation of the driving shaft increases, the speed of rotation of the drive pulley 100 increases with it. As a result, the arms 162 of the centrifugal actuators 158 pivot about their respective axles 164, thereby moving away from the movable sheave 104. As the arms 162 of the centrifugal actuators 158 pivot, they push against the rollers 150 to move the movable sheave 104 and the movable sheave shaft 126 axially toward the fixed sheave 102. As the movable sheave 104 and the movable sheave shaft 126 move axially toward the fixed sheave 102, the slider assemblies 200 abut and slide along surfaces of the spider 118 as will be described below. When the speed of rotation of the driving shaft is high enough, the movable sheave 104 and the movable sheave shaft 126 move to the position shown in FIGS. 6 and 7, which is as close as the movable sheave 104 can be to the fixed sheave 102. As the speed of rotation of the driving shaft decreases, the centrifugal actuators 158 pivot back toward the movable sheave 104 and the spring 136 moves the movable sheave 104 and the movable sheave shaft 126 axially away from the fixed sheave 102. As the movable sheave 104 and the movable sheave shaft 126 move axially away from the fixed sheave 102, the slider assemblies 200 abut and slide along surfaces of the spider 118 as will be described below.

Turning now to FIGS. 8 to 10C, one of the three slider assemblies 200 will be described in more detail. As the three slider assemblies 200 are identical, only one will be described. It is contemplated that at least one of the slider assemblies 200 could differ from the others.

Figure 10C:
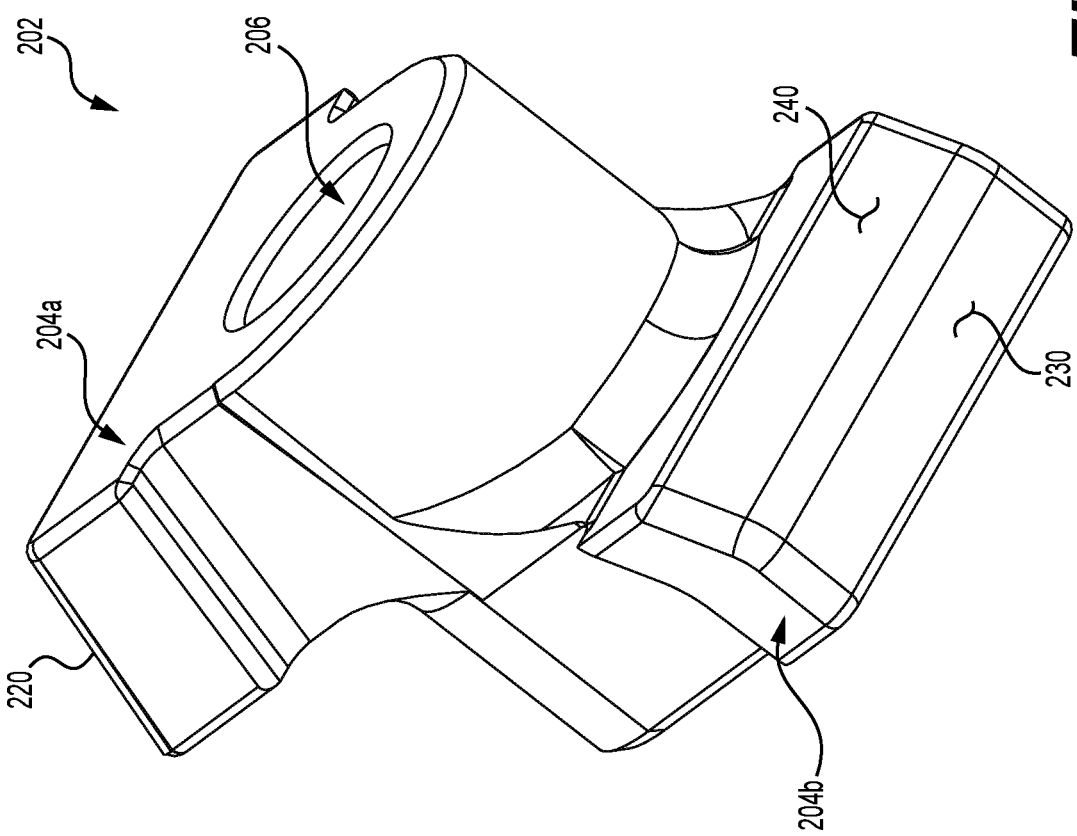
FIG. 10C is a perspective view of the slider block of FIG. 10A.

The slider assembly 200 has a slider block 202 having a body 204, best seen in FIGS. 10A to 10C. As can be seen, the slider block 202 has a body extension 204a disposed radially outward of a body extension 204b with respect to the axis of rotation 170 of the fixed sheave 104 (shown in FIG. 5A and as a cross sign in FIGS. 3 and 8). The body 204 of the slider block 202 is made of a polymeric material such as, but not limited to, polyimide-based plastic. It is contemplated that the slider block 202 could be made of any other suitable material such as, but not limited to, aluminum or other metals.

Figure 5C:
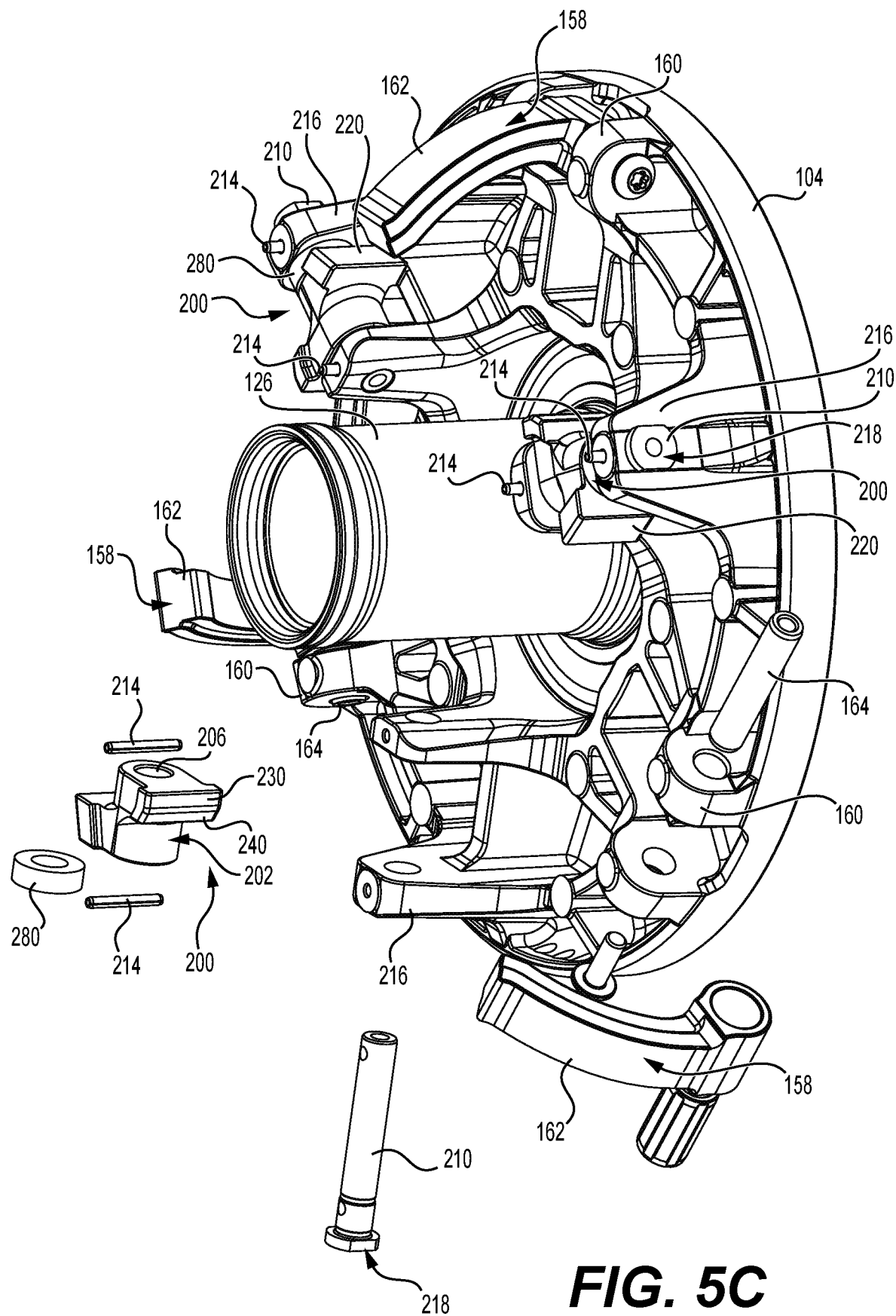
FIG. 5C is a partially exploded, perspective view taken from a bottom, left side of a movable sheave of the drive pulley of FIG. 3.
Figure 6:
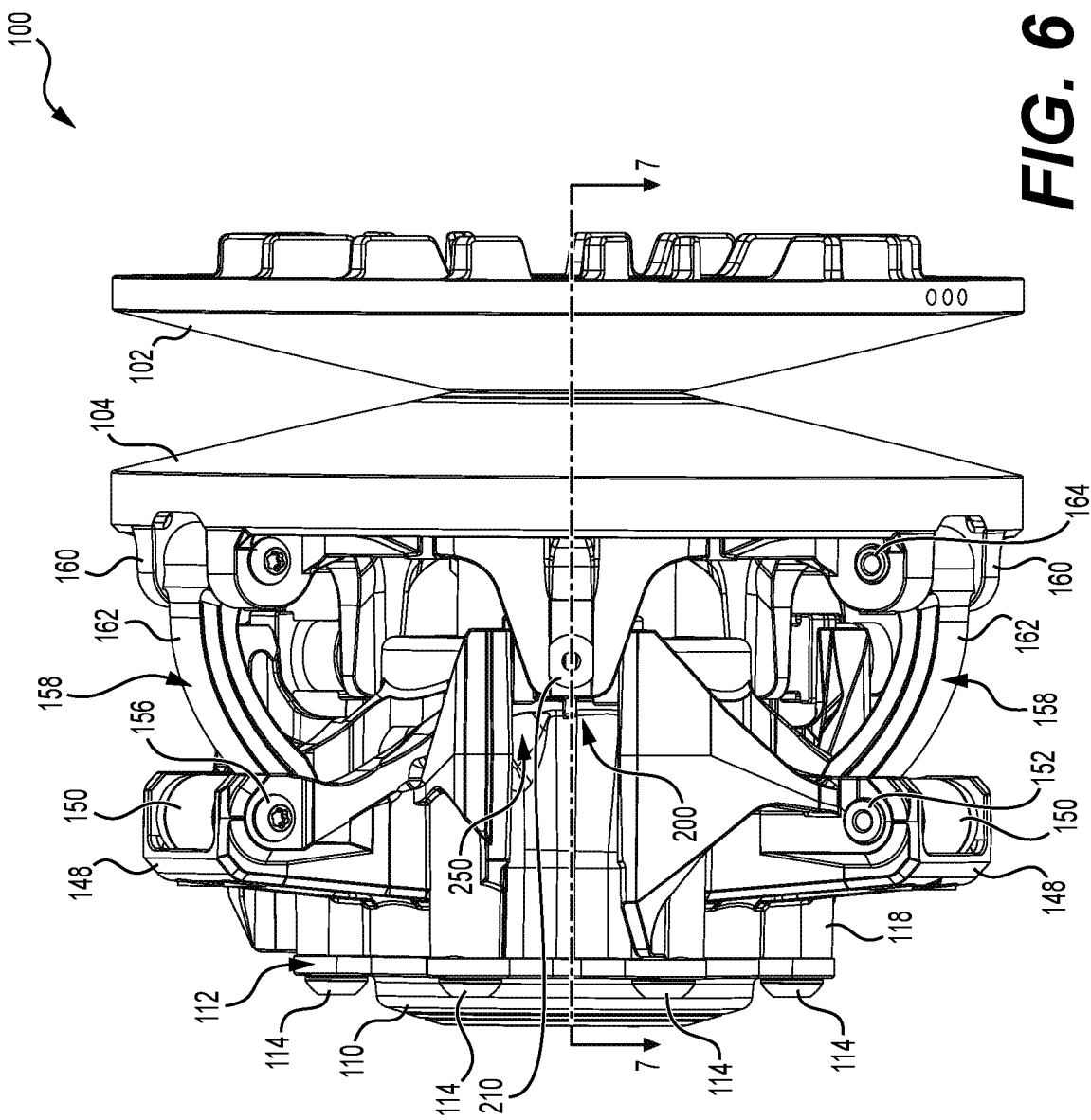
FIG. 6 is a bottom plan view of the drive pulley of FIG. 3, with the drive pulley in a closed position.

The body 204 of the slider block 202 also defines a cylindrical aperture 206 extending therethrough. The cylindrical aperture 206 defines an aperture axis 208, seen in FIGS. 9 to 10B. The slider block 202 is mounted on a radially extending cylindrical shaft 210. The cylindrical aperture 206 is dimensioned to receive the shaft 210 therein. It is contemplated that the aperture 206 and the shaft 210 could be shaped differently in other implementations. The shaft 210 defines a shaft axis 212. The shaft axis 212 is perpendicular to and intersects the axis of rotation 170 of the fixed sheave 104. The shaft 210 and the shaft axis 212 could extend in other directions in other implementations. The slider block 202 can slide freely along a sliding axis 213 defined by the shaft 210, the sliding axis 213 being the shaft axis 212. The aperture axis 208, the shaft axis 212 and the sliding axis 213 are thus coaxial in the present implementation. As the slider block 202 slides along the sliding axis 213 on the shaft 210, the slider block 202 can rotate slightly about the shaft axis 212. The shaft 210 is connected by pins 214 to a bracket 216 formed by the movable sheave 104. In the present implementation, the pins 214 are used instead of other types of fasteners due to available space and for weight considerations, but it is contemplated that other types of fasteners could be used in other implementations. The ends of the pins 214 project from the bracket 216 in order to be able to remove them by pulling them out of the bracket 216 when needed. The shaft 210 has a head portion 218 shaped to be received in the bracket 216, as best seen in FIG. 5C. As can be seen, the head portion 218 has two opposite flat sides that abut corresponding flat sides formed in the bracket 216, thereby preventing rotation of the shaft 210 in the bracket 216.

Figure 9:
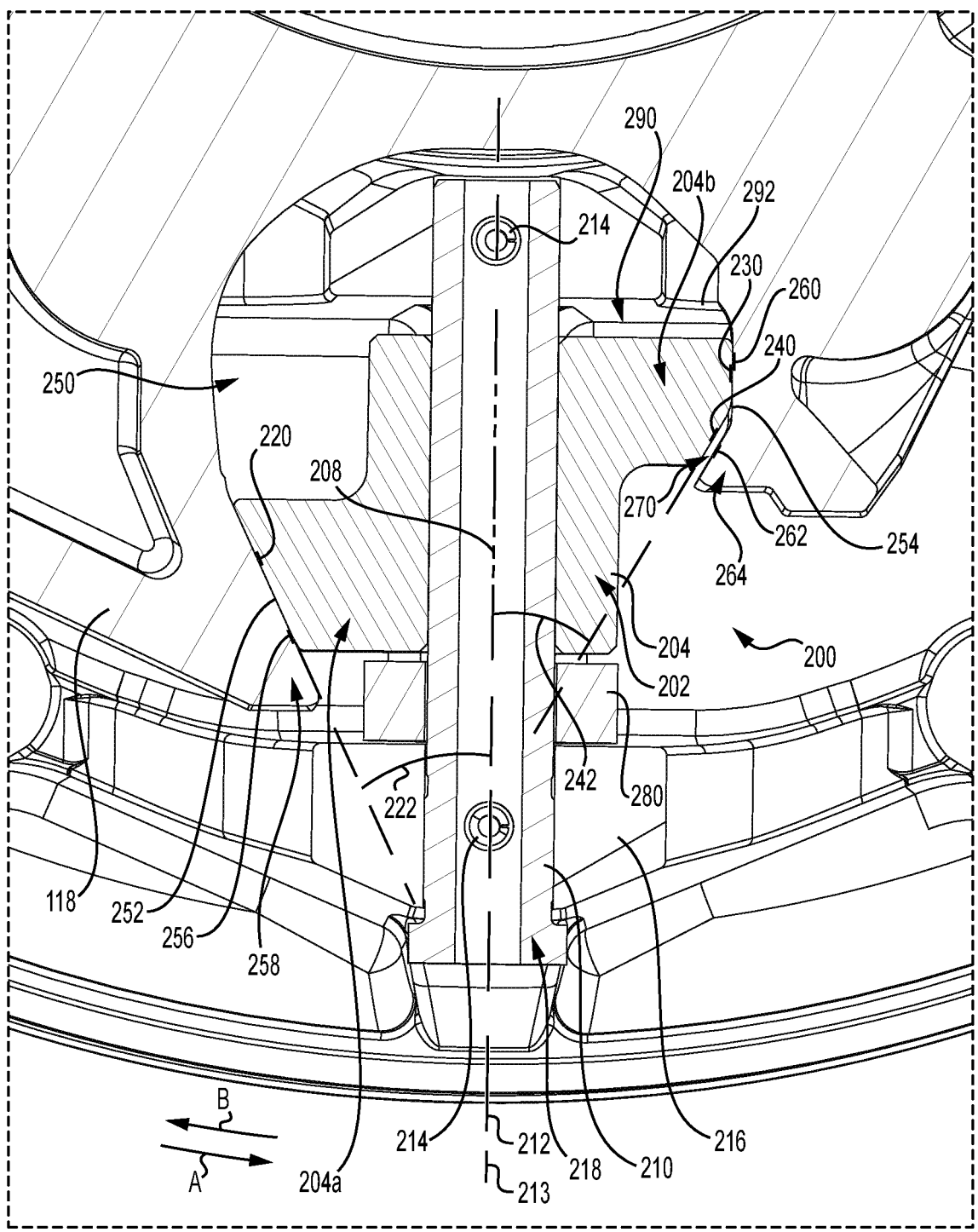
FIG. 9 is a close-up view of portion 9 of FIG. 8.

As can be seen in FIGS. 9 to 10C, the slider block 202 has an angled surface 220 defined by the body extension 204a. The angled surface 220 extends toward the sliding axis 213 as it extends away from the axis of rotation 170 of the fixed sheave shaft 106. The slider block 202 further has a surface 230 defined by the body extension 204b. The surface 230 is parallel to the sliding axis 213. The surfaces 220, 230 are planar and extend on opposite sides of the sliding axis 213, and on opposite sides of the aperture axis 208. The surface 220 is larger than the surface 230. The surface 220 is also disposed radially outward of the surface 230 with respect to the axis of rotation 170 of the fixed sheave shaft 106. The surface 220 also extends circumferentially further away from the sliding axis 213 than the surface 230. Referring to FIGS. 10A to 10C, the surface 220 is axially offset relative to the surface 230 with respect to the aperture axis 208. The angled surface 220 is disposed at an angle 222 between 20 and 30 degrees relative to the sliding axis 213 (and the aperture axis 208). The angle 222 could be different in other implementations. In some implementations, the angle 222 is greater than 10 degrees.

An angled surface 240 is also defined by the body extension 204b and extends from the surface 230. The angled surface 240 extends toward the sliding axis 213 as it extends away from the axis of rotation 170 of the fixed sheave shaft 106. The angled surface 240 is disposed at an angle 242 between 25 and 35 degrees relative to the sliding axis 213 (and the aperture axis 208). The angle 242 could be different in other implementations. In some implementations, the angle 242 is greater than 10 degrees. The angled surface 240 is also planar. In the present implementation, the angle 242 is of about 30 degrees while the angle 222 is of about 25 degrees. It is contemplated that the angled surface 220 is disposed at an angle between 20 and 65 degrees relative to the angled surface 240. The surface 240 is also smaller than the surface 220. Referring to FIGS. 10A to 10C, the surface 240 is also axially offset relative to the surface 220 with respect to the aperture axis 208.

For each slider assembly 200, the spider 118 defines a passage 250 inside which the slider block 202 is disposed as can be seen in FIGS. 5B, 8 and 9. The passage 250 is defined by walls 252 and 254 disposed on either side of the slider block 202. The body extension 204a of the slider block 202 abuts the wall 252. The angled surface 220 of the slider block 202 abuts an angled surface 256 of the wall 252 defined by a projection 258 of the wall 252. The angled surface 256 is disposed at the same angle 222 relative to the sliding axis 213 as the angled surface 220.

The surface 230 of the body extension 204b of the slider block 202 abuts a surface 260 of the wall 254 that is parallel to the sliding axis 213. The angled surface 240 of the body extension 204b of the slider block 202 is shown spaced apart from an angled surface 262 of the wall 254 defined by a projection 264 of the wall 254. The angled surface 262 is disposed at the same angle 242 relative to the sliding axis 213 as the angled surface 240.

When the slider block 202 is new and when the drive pulley 100 turns, the centrifugal forces acting on the slider block 202 push the slider block 202 radially outwardly with respect to the axis of rotation 170 of the fixed sheave shaft 106 along the sliding axis 213 (i.e. the shaft axis 212). Referring to FIG. 9, the slider block 202 is pushed radially outward (i.e. downwardly with respect to FIG. 9) by the centrifugal forces. As a result, the surface 220 of the slider block 202 abuts and pushes against the surface 256 of the wall 252, thereby pushing the spider 118 in the direction of arrow B, and the surface 230 of the slider block 202 abuts and pushes against the surface 260 of the wall 254, thereby pushing the spider 118 in the direction of arrow A. As a result, the slider block 202 will wedge itself between surfaces 256, 260 and eliminates backlash between the spider 118 and the movable sheave 104 thus eliminating, or at least reducing, wear of the arms 162 and the rollers 150 that would otherwise have resulted from free play of the movable sheave 104 relative to the spider 118.

Referring to FIG. 9, there can be seen that a gap 270 is defined between the angled surfaces 240, 262. The gap 270 serves a dual purpose. Firstly, due to manufacturing tolerances, the slider block 202 may be smaller than its intended size, and thus have the surfaces 220, 230 closer to the aperture axis 208 than expected. The gap 270 allows the slider block 202 to move radially outward along the sliding axis 213 until surfaces 220, 230 abut the surfaces 256, 260 respectively. Although not necessary to practice the present technology, the gap 270 allows the surface 240 to be less precise than surfaces 220, 230, which could reduce manufacturing costs. Secondly, over time and as the pulley 100 is used, the surfaces 220, 230 of the slider block 202 wear due to the contact with surfaces 256, 260. As the surfaces 220, 230 wear, the slider block 202 can slide further radially outward along the shaft 210 (i.e. downwardly with respect to FIG. 9) compared to when it was new. After some wear of the surfaces 220, 230, and some radially outward movement of the slider block 202 along the shaft 210, the angled surface 240 of the slider block 202 abuts and pushes against the surface 262 of the wall 254. Thus, at a certain point, it is possible that all three surfaces 230, 240, 250 of the slider block 202 abut and push their corresponding surface 256, 260, 262 of the spider 118, and all three surfaces 230, 240, 250 of the slider block 202 wear. The contacting of the surfaces 240, 262 centers the slider block 202 inside the passage 250 as the surfaces 220, 240 (and 256, 262) are angled relative to the sliding axis 213 in opposite directions.

Over time and as the pulley 100 is used, and after even more wear of the surfaces 220, 230, 240 has occurred by sliding along the surfaces 256, 260, 262 respectively, the slider block 202 abuts against a bumper 280 that is also mounted to the shaft 210. The bumper 280 is a ring-shaped component, best seen in FIG. 5C. In some implementations, the bumper 280 is made of a urethane-based material. The bumper 280 prevents the slider block 202 from sliding further radially along the shaft 210 (i.e. downwardly with respect to FIG. 9). The bumper 280 thus prevents that the surface 240 overhangs past its corresponding surface 262. By preventing such overhang of the surface 240 with respect to the surface 262, the surface 240 of the slider block 202 wears evenly. If the bumper 280 was omitted, a lip could form at the radially outward edge of the surface 240, and such a lip could prevent the slider block 202 from sliding freely along the shaft 210 under some conditions. If the slider block 202 does not slide freely along the shaft 210, this could prevent the movable sheave 104 from moving between the open and closed positions, seen in FIGS. 4 and 6. Also, although not ideal for the above reasons, it is contemplated that the bumper 280 could be omitted.

In other implementations, it is contemplated that a stopper could be used instead of the bumper 280, the stopper being structured to provide a hard stop as the slider block 202 abuts the stopper. In yet other implementations, the projections 258, 264 of the spider 118 could be shaped to limit or prevent the sliding of the slider block 202 along the shaft 210, and thus no bumper or stopper would be necessary in such implementations.

Still referring to FIG. 9, the slider block 202 is spaced apart by a spacing 290 from a face 292 of the spider 118 defining a portion of the passage 250. Should the slider block 202 be larger than its intended size due to manufacturing tolerances and have the surfaces 220, 230 further from the aperture axis 208 than expected, the spacing 290 allows the slider block 202 to slide along the shaft 210 radially inward (i.e. upwardly with respect to FIG. 9), and thus still fit into the passage 250. It is to be understood from the present description that when the slider block 202 is described to be smaller or larger than its intended size, it is meant that the slider block 202 can be sized according to the lower and upper limits of the manufacturing tolerances of the slider block 202.

As can be understood from FIG. 9, the contact surface between the surface 220 and the wall 252 (i.e. the contact surface where the surface 220 touches the surface 256) is larger than the contact surface between the slider block 202 and the wall 254 (i.e. the contact surface where the surfaces 230, 240 touch the surfaces 260, 262).

As can be seen by comparing FIGS. 5A and 7, the slider blocks 202 slide along the walls 252, 254 as the movable sheave 104 moves axially relative to the fixed sheave shaft 106. Since the slider block 202 slides, torque is transferred between the spider 118 and the movable sheave 104 while offering very little resistance to the axial displacement of the movable sheave 104.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A drive pulley for a continuously variable transmission comprising:
    a fixed sheave having an axis of rotation;
    a movable sheave axially movable relative to the fixed sheave;
    a spider axially fixed relative to the fixed sheave and rotationally fixed relative to the movable sheave, the movable sheave being disposed axially between the spider and the fixed sheave;
    a biasing member biasing the movable sheave axially away from the fixed sheave;
    at least one centrifugal actuator including an arm pivotally connected to one of the movable sheave and the spider, the arm pivoting away from the one of the movable sheave and the spider as a speed of rotation of the drive pulley increases, the arm pushing against another one of the movable sheave and the spider as the arm pivots away from the one of the movable sheave and the spider, thereby moving the movable sheave axially toward the fixed sheave; and
    at least one slider assembly including a slider block connected to one of the movable sheave and the spider and abutting another one of the movable sheave and the spider, the slider block sliding along the other one of the movable sheave and the spider as the movable sheave moves axially, the slider block moving along a radially extending sliding axis,
    the at least one slider assembly transferring torque between the movable sheave and the spider;
    for each of the at least one slider assembly:
        the other one of the movable sheave and the spider defining a passage between a first wall and a second wall;
        the slider block being disposed in the passage;
        the slider block having a first surface abutting and sliding along the first wall;
        the slider block having second and third surfaces abutting and sliding along the second wall;
        the first surface being larger than the second surface;
        the first surface being disposed radially outward of the second surface relative to the axis of rotation of the fixed sheave;
        the first and second surfaces being planar;
        the first surface extending circumferentially further away from the sliding axis than the second surface;
        the first surface being angled relative to the sliding axis;
        the second surface being parallel to the sliding axis;
        the third surface being angled relative to the sliding axis;
        the first and third surfaces extending toward the sliding axis as they extend away from the axis of rotation of the fixed sheave;
        a fourth surface of the first wall abutting the first surface of the slider block being angled relative to the sliding axis;
        a fifth surface of the second wall abutting the second surface of the slider block being parallel to the sliding axis;
        a sixth surface of the second wall abutting the third surface of the slider block being angled relative to the sliding axis; and
        the fourth and sixth surfaces extending toward the sliding axis as they extend away from the axis of rotation of the fixed sheave.

2. The drive pulley of claim 1, wherein for each of the at least one slider assembly, the slider block is connected to the movable sheave.

3. The drive pulley of claim 1, wherein:
    each of the at least one slider assembly further comprises a radially extending shaft connected to the movable sheave, the shaft defining a shaft axis, the sliding axis being the shaft axis; and
    for each of the at least one slider assembly, the slider block is mounted to the shaft.

4. The drive pulley of claim 3, wherein the shaft is cylindrical, and the slider block has a body defining a cylindrical aperture dimensioned to receive the shaft therein.

5. The drive pulley of claim 3, wherein for each of the at least one slider assembly, the slider block is movable along the shaft.

6. The drive pulley of claim 5, wherein each of the at least one slider assembly further comprises a bumper mounted to the shaft and being disposed radially outward of the slider block relative to the axis of rotation of the fixed sheave, the bumper being structured to abut the slider block and limit the movement of the slider block along the shaft.

7. The drive pulley of claim 6, wherein for each of the at least one slider assembly, the third surface of the slider block abuts the sixth surface of the second wall before the slider block abuts the bumper.

8. The drive pulley of claim 1, wherein:
a first angle is defined between the first surface and the sliding axis;
a second angle is defined between the third surface and the sliding axis; and
the second angle is greater than the first angle.

9. The drive pulley of claim 1, further comprising:
a fixed sheave shaft connected to the fixed sheave; and
a movable sheave shaft connected to the movable sheave, the fixed sheave shaft being disposed at least in part inside the movable sheave shaft;
wherein the movable sheave shaft is disposed at least in part inside the biasing member; and
wherein the biasing member is disposed at least in part inside the spider.

10. The drive pulley of claim 1, wherein for each of the at least one slider assembly, as the slider block wears, the slider block continues to abut and slide along the other one of the movable sheave and the spider as the movable sheave moves axially.

11. A continuously variable transmission comprising:
the drive pulley of claim 1;
a driven pulley having:
a fixed sheave; and
a movable sheave axially movable relative to the fixed sheave; and
a drive belt looped around the fixed and movable sheaves.

12. A vehicle comprising:
a frame;
a motor connected to the frame;
the continuously variable transmission of claim 11, the drive pulley being operatively connected to and driven by the motor;
a driven shaft connected to and driven by the driven pulley; and
at least one ground engaging member operatively connected to the driven shaft.

13. The vehicle of claim 12, wherein:
the frame includes a tunnel; and
the at least one ground engaging member is a drive track disposed at least in part under the tunnel;
the vehicle further comprising:
at least one ski operatively connected to the frame; and
a straddle seat disposed above the tunnel.

14. A slider block for a drive pulley of a continuously variable transmission having first and second walls, the slider block comprising:
a slider block body defining an aperture extending therethrough, the aperture defining an aperture axis, the slider block being configured to slide along the aperture axis during operation of the continuously variable transmission,
the slider block body having a first surface and a second surface for abutting and sliding along the first and second walls of the drive pulley,
the first and second surfaces extending on opposite sides of the aperture axis,
the first surface being larger than the second surface,
the first and second surfaces being angled relative to the aperture axis, and
the first surface being axially offset relative to the second surface.

15. The slider block of claim 14, wherein the first surface extends further away from the aperture axis than the second surface.

16. The slider block of claim 14, wherein the first and second surfaces are planar.

17. The slider block of claim 14, wherein:
a first angle is defined between the first surface and the aperture axis;
a second angle is defined between the second surface and the aperture axis; and
the first and second angles are greater than 10 degrees.

18. The slider block of claim 14, further comprising a third surface for abutting and sliding along the second wall of the drive pulley, the third surface extending parallel to the aperture axis.

19. The slider block of claim 18, wherein the third surface extends from the second surface.

20. The slider block of claim 18, wherein the third surface is planar.

* * * * *